United States Patent
Dunn

(10) Patent No.: US 7,681,512 B2
(45) Date of Patent: *Mar. 23, 2010

(54) WIND-POWERED, AIR CUSHIONED ROTATABLE PLATFORM

(76) Inventor: James L. Dunn, 17702 S. White Tail Ct., Houston, TX (US) 77084

( * ) Notice: Subject to any disclaimer, the term of this patent is extended or adjusted under 35 U.S.C. 154(b) by 0 days.

This patent is subject to a terminal disclaimer.

(21) Appl. No.: 12/057,084

(22) Filed: Mar. 27, 2008

(65) Prior Publication Data

US 2008/0236472 A1    Oct. 2, 2008

Related U.S. Application Data

(60) Provisional application No. 60/920,256, filed on Mar. 27, 2007.

(51) Int. Cl.
B63B 1/34 (2006.01)
B63B 1/38 (2006.01)
F03D 3/00 (2006.01)
F03D 11/00 (2006.01)
F03D 11/04 (2006.01)

(52) U.S. Cl. .................. 114/67 A; 114/264; 290/54; 290/55

(58) Field of Classification Search ........... 114/67 A, 114/121, 122, 264–267; 290/43, 44, 54, 290/55; 60/495; 415/7; 416/85
See application file for complete search history.

(56) References Cited

U.S. PATENT DOCUMENTS

| | | | |
|---|---|---|---|
| 206,631 A | 7/1878 | Smith | |
| 443,641 A | 12/1890 | Eastman | |
| 556,396 A | 3/1896 | Auld | |
| 588,143 A | 8/1897 | Hall | |
| 665,810 A | 1/1901 | Stretch | |
| 757,800 A | 4/1904 | Williams | |
| 921,940 A | 5/1909 | Atkinson | |
| 1,046,026 A * | 12/1912 | Salisbury | ................. 416/85 |
| 3,019,756 A | 2/1962 | Murri | |
| 3,134,452 A | 5/1964 | Latimer-Needham | |
| 3,216,518 A | 11/1965 | Beardsley | |

(Continued)

FOREIGN PATENT DOCUMENTS

CA    1146470 A1 *   5/1983

(Continued)

Primary Examiner—Ajay Vasudeva
(74) Attorney, Agent, or Firm—Douglas W. Rommelmann; Andrews Kurth LLP

(57) ABSTRACT

A wind-powered, fluid cushioned platform adapted to float on a body of liquid. The platform includes a deck having upper and lower surfaces and a lower peripheral member extending around the outer perimeter of the deck. A pump having a pump outlet is supported by the deck. A fill pipe has a first end connected to the pump outlet and a second end in communication with the lower surface of the deck. The pump is adapted to pump a fluid through the fill pipe to a blow tank formed beneath the deck between the surface of the liquid and the deck within the area circumscribed by the lower peripheral member. A plurality of vanes and/or sails are preferably coupled to the deck to catch the wind and use the power of the wind to rotate the floating platform. In one embodiment, apparatus is provided for the purpose of generating electricity as the platform rotates.

13 Claims, 5 Drawing Sheets

U.S. PATENT DOCUMENTS

| | | | |
|---|---|---|---|
| 3,275,090 A | | 9/1966 | Weiland |
| 3,468,279 A | | 9/1969 | Hawkins |
| 3,995,170 A | | 11/1976 | Graybill |
| 4,052,134 A | * | 10/1977 | Rumsey .................... 416/119 |
| 4,292,540 A | | 9/1981 | Thompson et al. |
| 4,411,212 A | * | 10/1983 | Bergman ................. 114/67 A |
| 4,508,972 A | | 4/1985 | Willmouth |
| 4,566,405 A | | 1/1986 | Graham |
| 4,684,817 A | | 8/1987 | Goldwater |
| 4,756,666 A | | 7/1988 | Labrador |
| 4,836,121 A | | 6/1989 | Kordon |
| 6,294,844 B1 | | 9/2001 | Lagerwey |
| 6,448,668 B1 | | 9/2002 | Robitaille |
| 6,465,900 B1 | | 10/2002 | Arcos |
| 6,734,576 B2 | | 5/2004 | Pacheco |
| 6,853,096 B1 | | 2/2005 | Yu et al. |
| 7,194,973 B2 | * | 3/2007 | Dunn ....................... 114/67 A |
| 7,235,893 B2 | * | 6/2007 | Platt ........................... 290/54 |
| 7,397,144 B1 | * | 7/2008 | Brostmeyer et al. .......... 290/53 |

FOREIGN PATENT DOCUMENTS

| | | |
|---|---|---|
| GB | 2041458 A | 9/1980 |
| GB | 2129060 | 5/1984 |
| WO | WO 03/016714 A1 * | 2/2003 |

* cited by examiner

WIND-POWERED, AIR CUSHIONED ROTATABLE PLATFORM

CROSS-REFERENCE TO RELATED APPLICATIONS

This application claims priority from U.S. Provisional Application Ser. No. 60/920,256, filed on Mar. 27, 2007. This application is related to applicant's U.S. Pat. No. 7,194,973, issued Mar. 27, 2007. Applicant incorporates by reference herein U.S. Provisional Application Ser. No. 60/920,256 and U.S. Pat. No. 7,194,973.

BACKGROUND OF THE INVENTION

1. Field of the Invention

The present invention relates generally to platforms and more particularly relates to floating, rotatable platforms powered by wind.

2. Description of the Related Art

U.S. Pat. No. 1,046,026 for "Wind Motive Apparatus," issued to Salisbury, discloses a central wheel and a plurality of radially extending arms having a plurality of downwardly extending annular air chambers secured to the arms. The annular air chambers are formed by a pair of plates which extend downwardly into a fluid. The air chambers are received in individual fluid channels containing the fluid. An air pump and pipes are provided to force air under pressure into the annular air chambers. In operation, wind pressure on sails turns the arms which are operatively connected with a shaft. The arms and parts thereon are supported by the annular air chambers which are buoyed up by air pressure trapped between the chamber plates and the fluid.

It is desired to have a rotatable platform that can be rotated with a minimal amount of energy, preferably wind energy. It is also desired to have a wind-powered rotatable platform that floats on a body of liquid. It is desired to have a floating, wind-powered, rotatable platform that is air cushioned.

SUMMARY OF THE INVENTION

The air cushioned, wind powered, rotatable platform according to a preferred embodiment of the present invention includes a circular deck having a lower hull around the outer perimeter of the deck. The lower hull preferably defines a buoyant chamber such that the platform has a positive buoyancy. Preferably, the platform is capable of floating on a fluid such as water. An air pump, preferably secured to the deck, is used to pump pressurized air via a fill pipe to a space beneath the deck between the surface of the water and the deck in the area circumscribed by the peripheral hull. Pressurized air may be pumped below the deck into the contained space to raise the level of the deck, to allow or facilitate rotation of the deck, or to maintain the deck elevation upon adding weight to the deck while it is floating. A plurality of vanes and/or sails are preferably coupled to the deck to catch the wind and use the power of the wind to rotate the floating platform. In one embodiment, apparatus is provided for the purpose of generating electricity as the platform rotates.

BRIEF DESCRIPTION OF THE SEVERAL VIEWS OF THE DRAWINGS

A better understanding of the invention can be had when the following detailed description of the preferred embodiment is considered in conjunction with the following drawings, in which.

DESCRIPTION OF THE PREFERRED EMBODIMENTS

Figure 1:
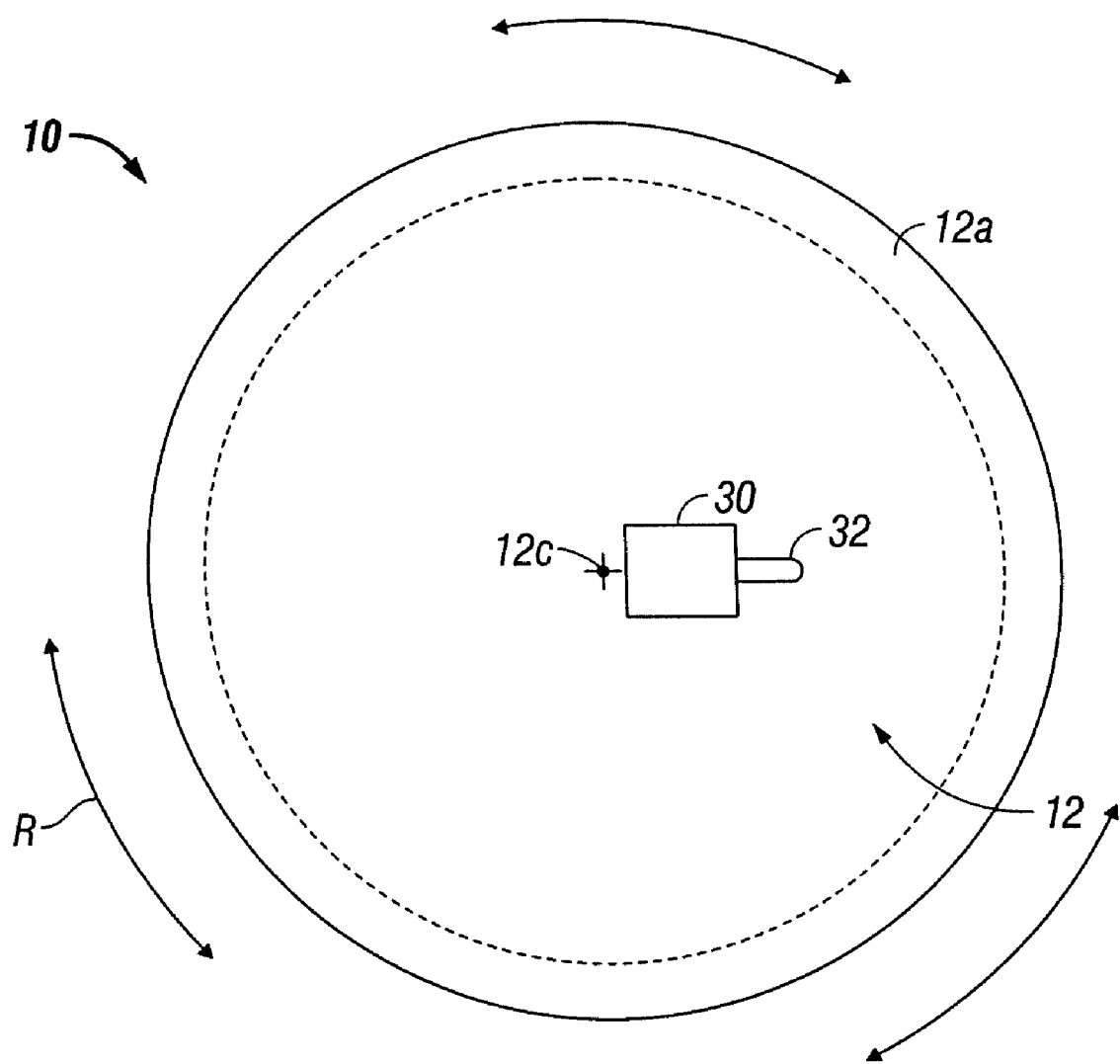
FIG. 1 is a plan view of a rotatable platform according to a preferred embodiment of the present invention.
Figure 2:
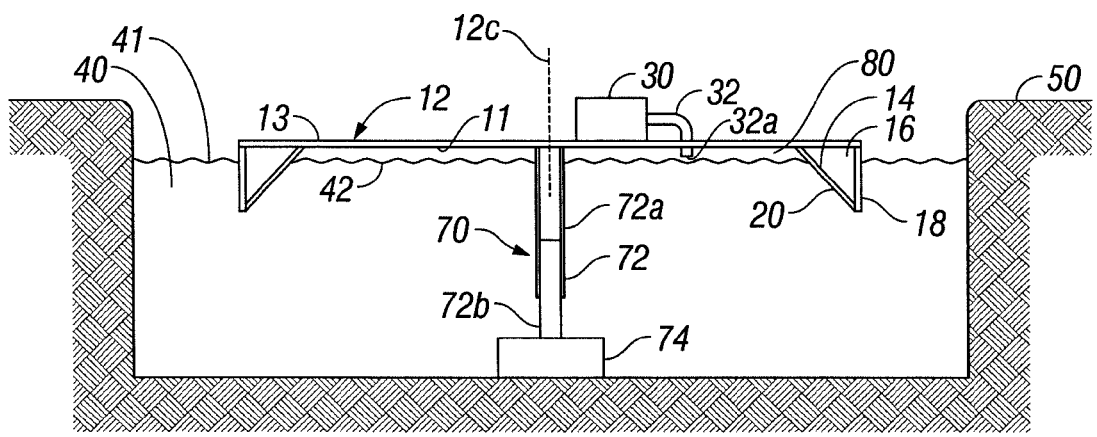
FIG. 2 is a side elevation view of the rotatable platform floating on a fluid surface in a first position.
Figure 4:
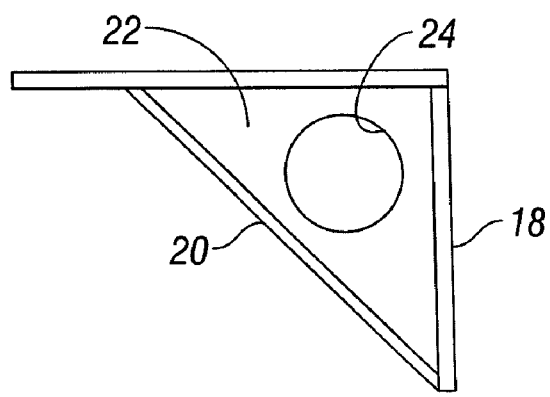
FIG. 4 is a sectional view of a portion of the platform hull.

The present invention will now be described in detail with reference to the drawings. The rotatable platform according to a preferred embodiment of the present invention, generally designated as 10, includes a deck 12 preferably circular in shape and having a center point 12c as shown in FIG. 1. The deck 12 has a lower surface 11 and an upper surface 13, preferably a flat, upper surface (FIG. 2). The platform 10 has a lower hull 14 at an outer portion 12a of the deck 12 as shown in FIG. 2. The hull 14 preferably extends around the periphery of the deck 12. Preferably, the hull 14 defines a buoyant chamber or volume 16. The buoyant chamber 16 is preferably watertight. As shown in the embodiment of FIG. 2, the hull 14 preferably includes a vertical member 18 joined at its upper end to the deck 12 and at its lower end to a diagonal member 20. The diagonal member 20 is joined to the lower surface 11 of the deck 12. As shown in FIG. 4, the cross-section of the hull 14 is preferably triangular in shape.

As shown in FIG. 4, the hull 14 may include a plurality of internal stiffener plates 22 to provide reinforcement for the hull 14. It may be desirable to include an opening 24 in the stiffener plates 22 to provide fluid communication throughout the entire buoyant chamber 16. Alternatively, the buoyant chamber or volume 16 may be formed by using a lightweight material such as an expanded rigid polystyrene plastic or other material commonly used as flotation material.

It is to be understood that the hull 14 may be connected to the deck 12 or formed integrally with the deck 12. The deck 12 and hull 14 are preferably constructed of strong, rigid materials such as wood, aluminum, metal, fiberglass or plastic.

Referring to FIGS. 1 and 2, preferably an air pump 30 is secured to the deck 12. A fill pipe 32 has one end connected to the outlet of the air pump 30 and a second end 32a communicating with a blow tank 80. The blow tank 80 comprises the air-filled area below the deck 12 within the "footprint" or area circumscribed by the peripheral hull 14. The fill pipe 32 is preferably made of a rigid pipe material, including, but not limited to, metal. The air pump 30 may be used to pump air beneath the deck 12 via the fill pipe 32 for reasons which will be explained below.

Referring to FIG. 2, the rotatable platform 10 according to the present invention floats on the surface of a fluid body 40, preferably water. The body of water 40 is contained preferably in an open pool, tank or other vessel or by ground or earthen barriers 50. The buoyant chamber 16 provides positive buoyancy to the rotatable platform 10. The deck 12 is preferably air tight such that air does not pass through the deck 12 from the lower surface 11 to the upper surface 13 with the exception of the fill pipe 32 as described above.

As shown in FIG. 1, the platform 10 is capable of rotating about its center point 12c. Preferably, the platform 10 can rotate in either direction as indicated by the arrows R. Referring to FIG. 2, an assembly 70 is shown for preferably maintaining the position of the platform 10 as it rotates. The positioning assembly 70 may comprise a telescoping shaft 72 having an upper portion 72a attached at its upper end to the deck center point 12c and a lower portion 72b secured at its lower end to a block or base 74. The telescoping shaft 72 permits anticipated changes in the vertical position of the platform 10. The telescoping shaft 72 may permit relative rotation between the upper and lower shaft portions 72a and 72b, respectively. Alternatively, the upper and lower shaft portions 72a and 72b can be assembled to prevent relative rotation therebetween and the block 74 can include a motor adapted to rotate the telescoping shaft 72 and thus the platform 10.

It is to be understood that there are many ways to position and rotate the platform 10 which are contemplated and known to persons skilled in the art. The techniques described herein are merely some preferred techniques.

Figure 5:
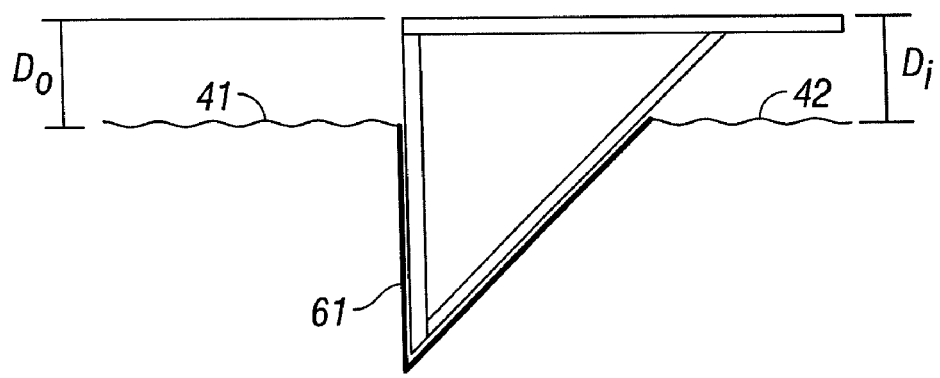
FIG. 5 is an enlarged portion of the floating hull from FIG. 2 in the first position showing the hull surface area in contact with the water.

In FIG. 2, the rotatable platform 10 is floating in a first position as might naturally be assumed by the buoyant platform 10 upon being placed on the surface 41 of the water 40. In the first position shown in FIG. 2, some amount of air is trapped and contained within the blow tank 80 (i.e., the footprint of the peripheral hull 14 between the lower surface 11 of the deck 12 and the surface 42 of the water 40). Preferably, the blow tank 80 has a diameter substantially the same as the diameter of deck 12. Referring to FIG. 5 showing the platform 10 in the first position, $D_o$ represents the vertical distance from the upper surface 13 of the deck 12 to the surface 41 of the water on the outside of the hull 14 and $D_i$ represents the vertical distance from the upper surface 13 of the deck 12 to the surface 42 of the water on the inside of the hull footprint. Although $D_i$ and $D_o$ are shown as being substantially equal, this may or may not be the case in every instance. As a result of the positive buoyancy of the rotatable platform 10, only a portion of the hull surface area is in contact with the water. The wetted surface area in the first position is indicated by the heavy lines in FIG. 5 referenced as 61. The wetted surface area 61 is relevant to the drag force required to be overcome to rotate the platform 10 about its center point or central axis.

Figure 3:
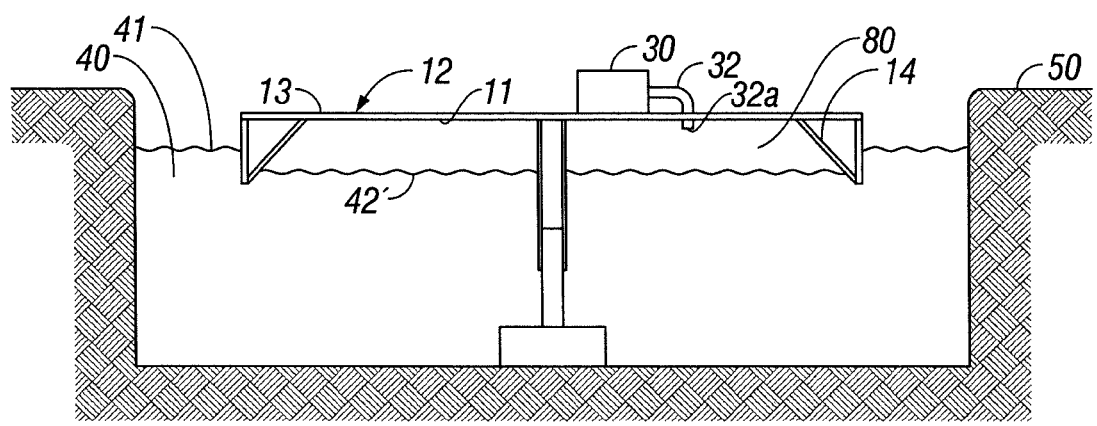
FIG. 3 is a view similar to FIG. 2 showing the floating, rotatable platform in a second position.

With reference to FIG. 3, the platform 10 is floating in a second position. The platform 10 achieves the second position by actuating the pump 30 to pump air through the fill pipe 32 to the blow tank 80 beneath the deck 12. The air is trapped in the blow tank 80 beneath the deck 12 within the hull footprint. As air is pumped beneath the deck 12, the air pressure trapped beneath the deck 12 increases. The increase in air pressure exerts an upward force on the exposed lower surface of the deck 12 and a downward force on the water within the hull footprint. The downward force on the water is uniformly distributed and may result in forcing some of the water out of the hull footprint. Displacement of the water results in additional buoyancy of the platform 10. Since vertical forces must be balanced for a stabilized, stationary object, by increasing the air pressure within the blow tank 80, one or more of the following occurs: (1) the level of the water surface 42' within the hull footprint drops; (2) the volume of the blow tank 80 increases; (3) the buoyancy of the platform 10 increases; (4) the vertical distance from the upper surface 13 of the deck to the surface of the water on the outside of the hull increases; and (5) the wetted surface area 62 decreases.

Figure 6:
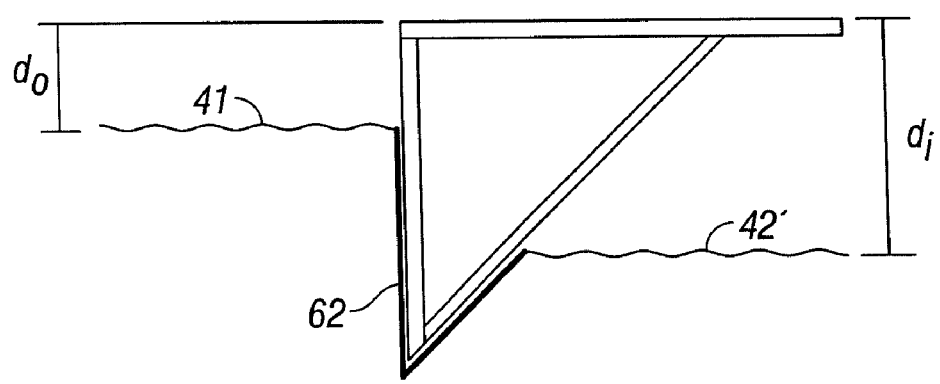
FIG. 6 is an enlarged portion of the floating hull from FIG. 3 in the second position showing the hull surface area in contact with the water.

In FIG. 6 which shows the platform 10 in the second position, $d_o$ represents the vertical distance from the upper surface 13 of the deck 12 to the surface 41 of the water on the outside of the hull 14 and $d_i$ represents the vertical distance from the upper surface 13 of the deck 12 to the surface 42' of the water on the inside of the hull footprint. The wetted surface area in the second position is indicated by the heavy lines in FIG. 6 referenced as 62.

In comparing the second position (FIG. 6) to the first position (FIG. 5), $d_i$ is greater than $D_i$ and $d_o$ is greater than $D_o$ as a result of the pressurized air trapped beneath the deck 12. As a result, the wetted surface area 62 is less than the wetted surface area 61. The reduced wetted surface area 62 reduces the drag force and results in a lower power requirement to rotate the platform 10.

Figure 7:
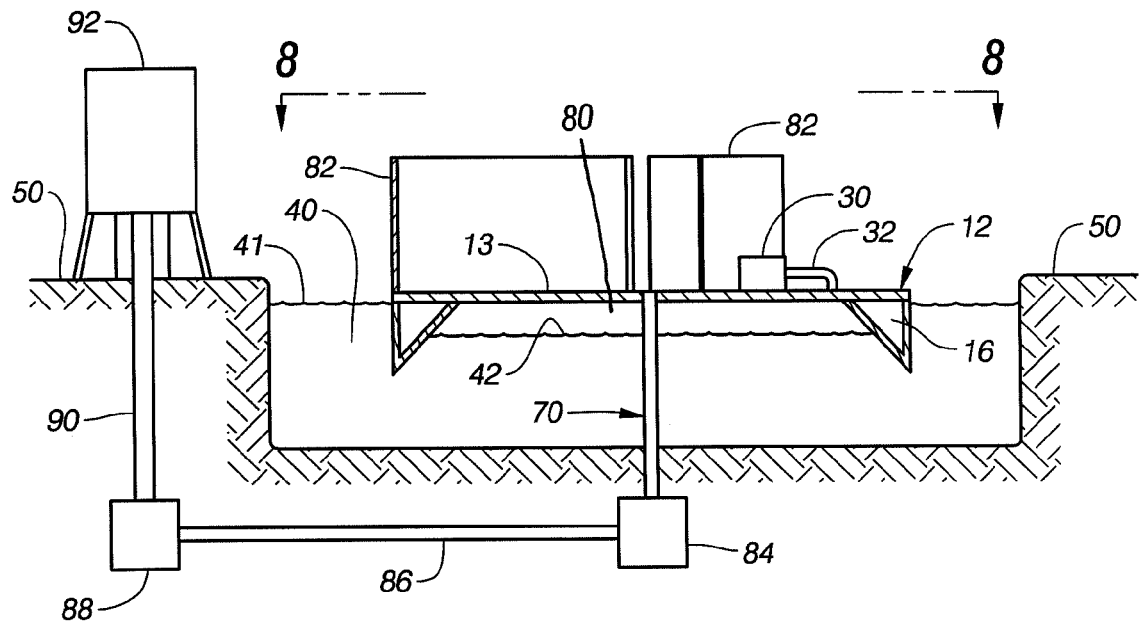
FIG. 7 is a side elevation view of a wind-powered rotatable platform according to a preferred embodiment of the present invention, the wind-powered rotatable platform incorporating a plurality of vanes.
Figure 8:
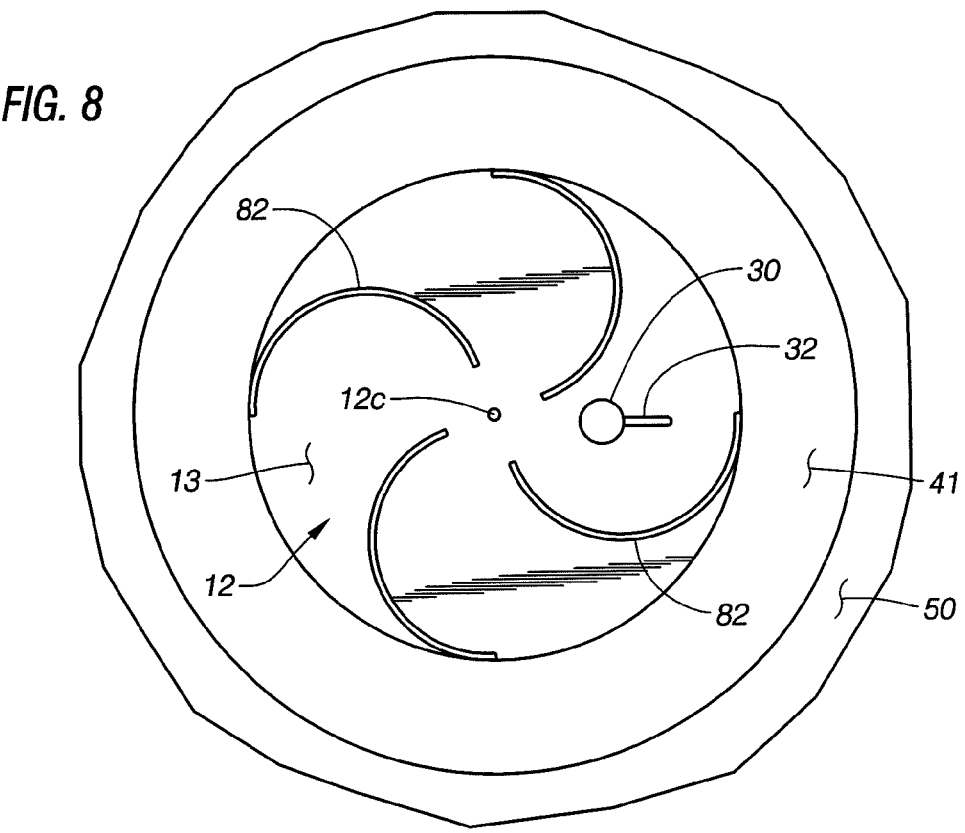
FIG. 8 is a plan view taken along lines 8-8 of FIG. 7.

FIGS. 7 and 8 illustrate a preferred embodiment of a wind-powered rotatable platform according to the present invention. It is to be understood that similar reference numbers indicate similar components described with respect to previous embodiments. A plurality of vanes 82 are coupled, preferably securely attached, to the deck 12, more preferably to the deck upper surface 13. The vanes 82 are adapted to catch the wind and harness the power of the wind to rotate the floating platform. The vanes 82 preferably have a curvilinear shape and are preferably constructed of a rigid material, such as metal, wood or plastic. It is to be understood that various shapes and sizes of vanes may be used depending on the desired capabilities.

With reference to FIG. 7, it may be desirable to include apparatus for the purpose of generating electricity as the platform rotates, as for example via a mechanical arrangement and a generator 92. For example, positioning assembly 70 may be coupled to a first gearbox 84, a transverse shaft 86, a second gearbox 88, a generator shaft 90 and a generator 92. When the deck 12 rotates, the positioning assembly 70 rotates and drives the first gearbox 84, which in turn rotates the transverse shaft 86, driving the second gearbox 88, rotating the generator shaft 90 such that the generator 92 generates electricity. Thus, wind-power is used to generate electricity via the mechanical arrangement.

Figure 9:
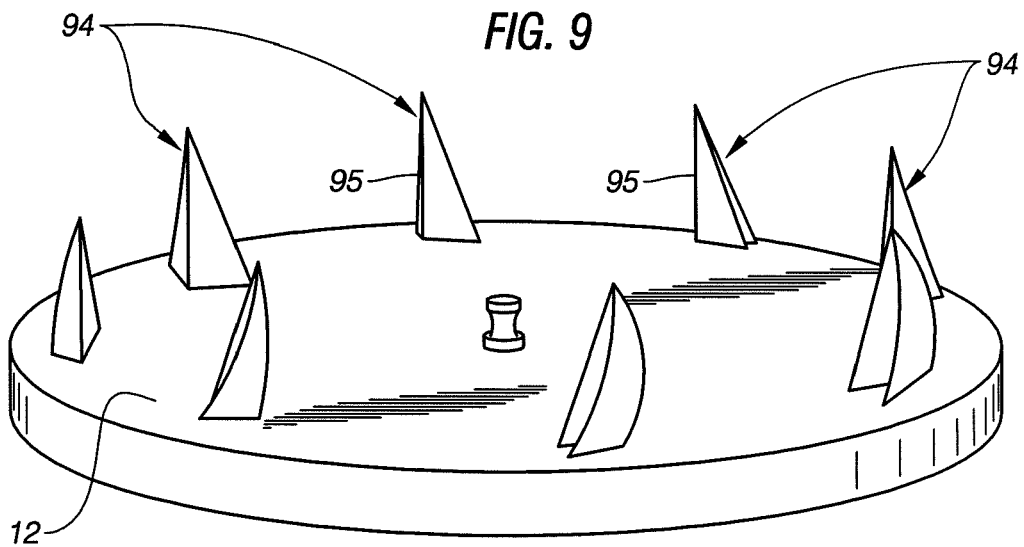
FIG. 9 is a perspective view of another preferred embodiment of a wind-powered rotatable platform incorporating a plurality of sails.

FIG. 9 is a perspective view of another preferred embodiment of the wind-powered rotatable platform. In this embodiment of the present invention, the plurality of vanes 82 (FIGS. 7 and 8) are replaced with a plurality of sail and mast assemblies 94. The plurality of sail and mast assemblies 94 are coupled, preferably securely attached, to the deck 12, more preferably to the deck upper surface 13. The sails 95 are adapted to catch the wind and harness the power of the wind to rotate the platform. Various shapes and sizes of sails 95 may be used. The sails 95 may be of the spinnaker-type.

Figure 10:
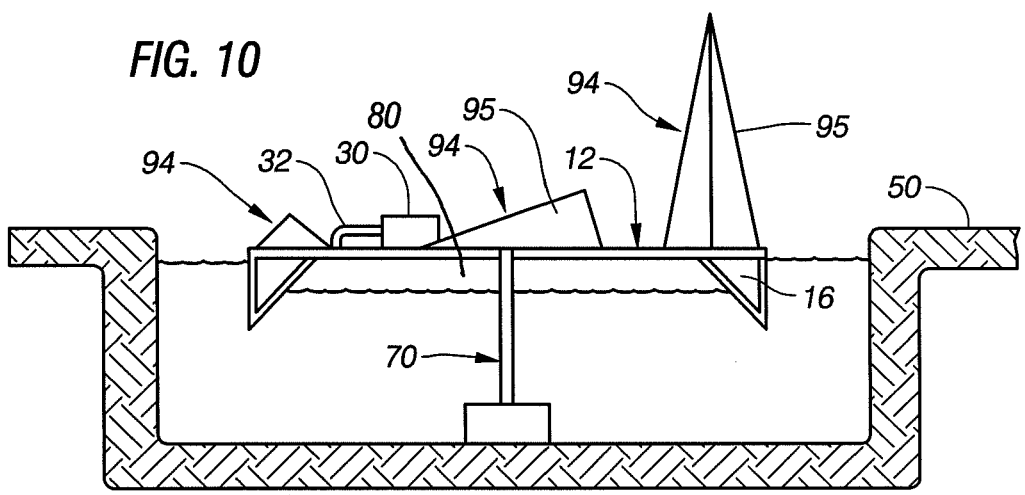
FIG. 10 is a side elevation view of another embodiment of a wind-powered rotatable platform incorporating a plurality of sails.
Figure 11:
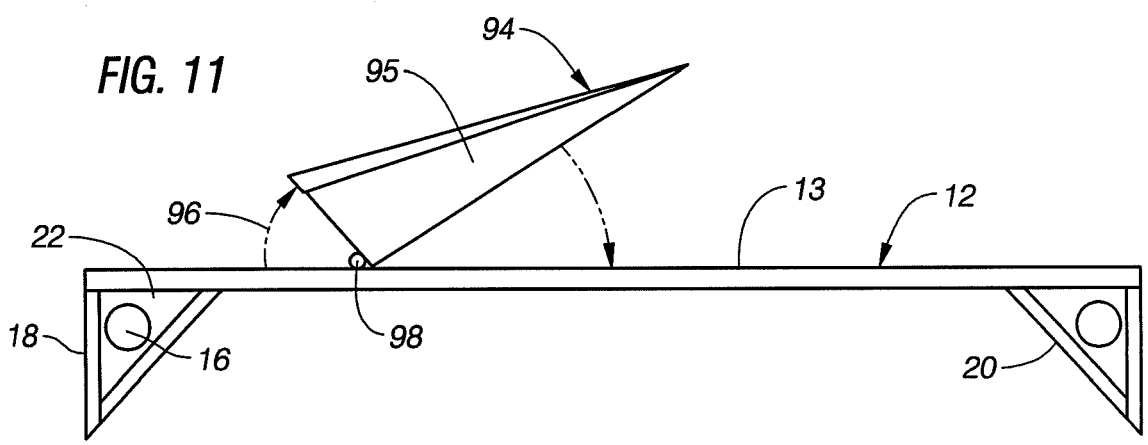
FIG. 11 is a partial side elevation view of the embodiment of FIG. 10 illustrating the angular rotation of the sail.

FIGS. 10 and 11 illustrate another embodiment of the wind-powered rotatable platform according to the present invention. In this embodiment the plurality of sail and mast assemblies 94 are preferably mounted to the deck 12 with a pivot or hinge connection 98 to allow the sail and mast assembly 94 to pivot between upright and prone positions depending on the relative angle of the wind with respect to the sail and mast assembly 94. Preferably, the sail and mast assembly 94 pivots or "folds", preferably automatically by the wind, to its prone position to minimize "drag" or resistance to rotation of the floating platform and pivots to its upright position, preferably automatically by the wind, when "catching" the wind to facilitate rotation of the platform.

The invention has been described with respect to facilitating rotation of a platform 10, preferably by harnessing wind energy. It is to be understood that the platform 10 can be various sizes and used for various purposes. For example, pressurized air may be pumped below the deck into the blow tank 80 to raise the level of the deck or to maintain the deck elevation upon weight being added to the deck while it is floating. It is also to be understood that the positioning assembly 70 is optional and may not be needed to practice the invention in certain circumstances.

The foregoing disclosure and description of the invention are illustrative and explanatory thereof, and various changes in the details of the illustrated apparatus and construction and method of operation may be made without departing from the spirit of the invention.

I claim:

1. A wind-powered, air cushioned, rotatable platform for floating on a body of liquid, the platform comprising:

a deck having an upper surface, a lower surface and a rigid lower hull extending around an outer perimeter of said deck and below said lower surface, said rigid lower hull comprising a watertight buoyant chamber and defining a hull footprint circumscribing a circular area, a blow tank being defined by a space between said deck lower surface and said circular area circumscribed by said hull footprint at the surface of the body of liquid, wherein a substantial portion of said blow tank is spaced laterally from said watertight buoyant chamber;

an air pump supported by said deck and having a pump outlet;

a fill pipe having a first end connected to said pump outlet and a second end in communication with said lower surface of said deck;

wherein said air pump is adapted to pump air through said fill pipe to said blow tank; and a plurality of vanes coupled to said deck designed and arranged to catch the wind and harness the power of the wind to rotate the floating platform.

2. The platform of claim 1, wherein said fill pipe is the only passageway for air to pass through said deck.

3. The platform of claim 1, wherein said fill pipe is the only passageway through said deck from said deck upper surface to said blow tank.

4. The platform of claim 3, wherein said blow tank has a volume which is adapted to vary with changes in air pressure within said blow tank.

5. The platform of claim 1, wherein said deck is circular and said blow tank has a diameter substantially the same as the diameter of said circular deck.

6. A wind-powered, fluid cushioned, rotatable platform for floating on a body of liquid, the platform comprising:

a deck having a continuous upper surface defining a circle having a center point and a radius, a lower surface and a rigid lower peripheral member extending around an outer perimeter of said deck, said rigid lower peripheral member defining a buoyant chamber providing positive buoyancy to said deck, said rigid lower peripheral member forming a circular footprint in the body of liquid to minimize the drag force when rotating the rotatable platform;

a pump supported by said deck and having a pump outlet;

a fill pipe having a first end connected to said pump outlet and a second end in communication with said lower surface of said deck;

wherein said pump is adapted to pump a fluid through said fill pipe to a blow tank formed beneath said deck between the surface of the liquid and said deck lower surface within the area circumscribed by said rigid lower peripheral member, a substantial portion of said blow tank being spaced laterally from said buoyant chamber;

a plurality of sail and mast assemblies coupled to the deck designed and arranged to catch the wind and harness the power of the wind to rotate the floating platform.

7. The platform of claim 6, wherein said fill pipe is the only passageway through said deck from said deck upper surface to said blow tank.

8. The platform of claim 7, wherein said blow tank has a volume which is adapted to vary with changes in fluid pressure within said blow tank.

9. The platform of claim 6, wherein said blow tank has a radius substantially the same as said radius of said circular deck.

10. A method of rotating a floating platform on a body of liquid, the floating platform having a generally horizontal, circular deck having a continuous upper surface defining a circle having a center point and a radius, a deck lower surface and a downwardly extending peripheral rigid, buoyant hull member extending below the deck lower surface, the method comprising the steps of:

floating the platform on the downwardly extending peripheral rigid, buoyant hull member in a first buoyant platform position in the body of liquid, the first buoyant platform position having a first wetted hull surface area;

forming a blow tank beneath the deck between the surface of the liquid and the deck lower surface within a circular hull footprint defined by the area circumscribed by the peripheral rigid, buoyant hull member, a substantial portion of said blow tank being spaced laterally from said buoyant hull member, said circular hull footprint facilitating rotation of the floating platform;

pumping a fluid into the blow tank to manipulate the floating platform to a second buoyant platform position, the second buoyant platform position having a second wetted hull surface area that is less than the first wetted hull surface area;

providing a plurality of wind-catching assemblies on the deck; and harnessing the wind via the wind-catching assemblies to effectuate rotation of the floating platform.

11. The method of claim 10, wherein the blow tank has a diameter substantially the same as the diameter of the circular deck.

12. The method of claim 10, wherein said fluid pumping step increases the buoyancy of the floating platform.

13. The method of claim 10, further comprising the step of rotating the floating platform while in the second buoyant platform position, with the second wetted hull surface area and the circular hull footprint of the rigid, buoyant hull member producing minimal resistance to rotation.

* * * * *